No. 851,562. PATENTED APR. 23, 1907.
J. H. RUFF.
SPRAYING NOZZLE.
APPLICATION FILED NOV. 19, 1906.
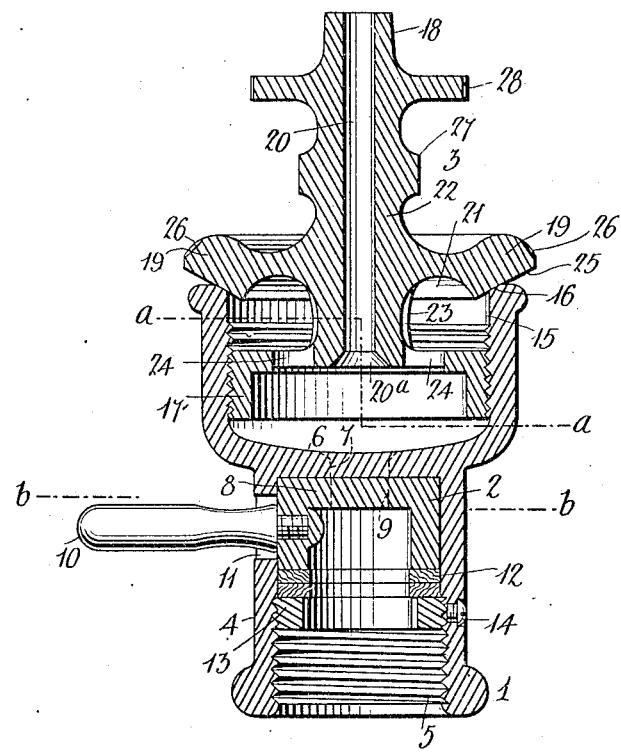
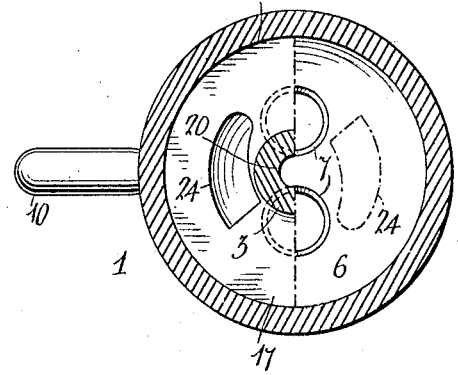
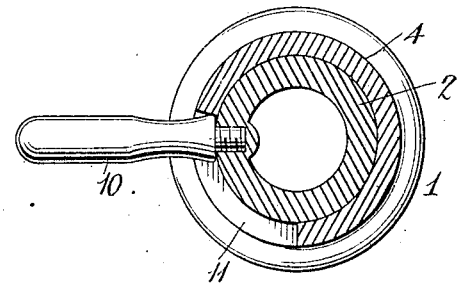
Witnesses
Inventor
Joseph H. Ruff
by
Attorneys

UNITED STATES PATENT OFFICE.

JOSEPH HERBERT RUFF, OF HOLLYWOOD, CALIFORNIA.

SPRAYING-NOZZLE.

No. 851,562.      Specification of Letters Patent.      Patented April 23, 1907.

Application filed November 19, 1906. Serial No. 344,146.

*To all whom it may concern:*

Be it known that I, JOSEPH HERBERT RUFF, a citizen of the United States, residing at Hollywood, in the county of Los Angeles and State of California, have invented certain new and useful Improvements in Spraying-Nozzles; and I do declare the following to be a full, clear, and exact description of the invention, such as will enable others skilled in the art to which it appertains to make and use the same.

My invention is an improved spraying nozzle for use in sprinkling lawns, and for other similar purposes, and it consists in the construction, combination, and arrangement of devices hereinafter described and claimed.

In the accompanying drawings,—Figure 1 is a vertical sectional view of a spraying nozzle embodying my invention; Fig. 2 is a sectional view of the same, taken on the plane indicated by the line $a$—$a$ of Fig. 1; and Fig. 3 is a similar view, taken on the plane indicated by the line $b$—$b$ of Fig. 1.

My invention comprises essentially a valve casing or body 1, a cut-off valve 2, and a spraying valve and nozzle 3. The body or casing 1 is cylindrical in form and has its lower end reduced, as at 4, and provided in its lower portion with an internal screw-thread 5, to enable it to be attached to a hose, hydrant, or the like. The enlarged portion of the body or casing has a concave bottom 6, provided with a pair of openings 7, the upper ends of which are flared, as shown. The reduced portion 4 of the body or casing, immediately below the bottom 6, is cylindrical in form, and in said reduced portion is mounted the cut-off valve 2, which is cylindrical in form, has a top 8 and has its lower portion open. The top 8 is provided with openings 9, which are of the same size as the openings 7, and are so disposed that when the valve 2 is turned, said openings 9 may be caused to register with the openings 7, either in whole, or in part, and may also be moved entirely out of alinement with said openings 7, so that the top 8 will close said openings 7. A handle 10, has its inner end screwed to the valve 2, and the said handle projects radially from said valve and operates in a slot 11 in one side of the reduced portion 4 of the body or casing. A gasket 12, which may be made of any suitable material, bears against the lower end of the valve 2 and is held in place by a ring 13, which is secured in the reduced portion 4 and is prevented from turning, after it has been adjusted, by means of a set-screw 14. The upper edge of the chamber 15 formed in the upper portion of the body or casing 1, is beveled on its inner side, as at 16, and the said chamber is interiorly screw-threaded.

The nozzle and spraying valve 3 comprises the inverted, cup-shaped, lower portion 17, the nozzle portion 18, which rises therefrom and a spraying disk 19, which is formed integrally therewith and is disposed above and spaced from said cup-shaped portion 17. The said cup-shaped portion, which is cylindrical in form and hollowed on its under side, is provided with exterior screw threads to enable the same to be screwed into the chamber 15 of the body or casing 1. The bore 20 of the nozzle portion has its lower end enlarged and of conical form, as at $20^a$. The under side of the spraying disk or valve 19 is hollowed to form a chamber 21, above the top of the inverted, cup-shaped lower portion 17. The contracted neck 22 is formed with strengthening ribs 23, and elongated openings 24 are formed in the top of the inverted, cup-shaped portion 17, at diametrically opposite points, and are narrowed, each in one direction, the narrowed ends of the said openings extending in opposite directions. The lower side of the outer portion of the spraying valve disk 19 is beveled, as at 25, to correspond with a bevel 16 around the upper edge of the chamber 15 of the body or casing 1, so that in effect the said spraying disk 19 is an inverted conic frustum. The upper edge of the spraying disk 19 is milled, as at 26, to enable the nozzle portion to be readily screwed into and out of the body portion 1. The intermediate portion of the nozzle is formed with a polygonal enlargement 27, which may be engaged by a wrench, and above said enlargement is a head or button 28, which is also preferably milled at its periphery.

When the nozzle portion is screwed into the body portion to its full extent, so that the inclined surface 25 of the disk 19 engages the surface 16 of the chamber 15, and the valve 2 is open, the water can only escape through the bore 20 of the nozzle, and will spurt upward therefrom, either in a jet or as a spray, according to the extent to which the valve 2 is open and the force of the head of water. When the nozzle portion is unscrewed slightly to open the joint between the surfaces 16 and 25, a spray will issue radially and upwardly therefrom.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention, as defined by the appended claims.

Having thus described my invention, what I claim as new, and desire to secure by Letters-Patent, is,—

1. A spraying nozzle comprising a body or casing having an open-top chamber in its upper side, openings in the bottom of said chamber, and a valve coacting with said openings to cut off or permit the passage of water therethrough, in combination with a nozzle having a jet bore and further provided with an inverted, enlarged, cup-shaped bottom portion screwed into the chamber and having openings in its upper side, said nozzle being further provided with a spraying disk hollow on the side presented to said chamber and beveled to coact with and project beyond the upper edge of the chamber or top to permit or cut off the passage of water between them.

2. The herein-described spraying nozzle comprising a body or casing having a chamber in its upper portion, provided with a concave bottom and openings therein, the upper edge of said chamber being beveled outwardly, said body being further provided with a reduced cylindrical portion below the said chamber, a cut-off valve revoluble in said reduced lower portion and having openings to coact with those in the bottom of said chamber, and a nozzle portion having a jet bore and further provided with an enlarged, inverted cup-shaped lower portion screwed into the chamber of the body and having openings in its upper side, said nozzle portion being further provided with a spraying disk above the inverted cup-shaped portion, said spraying disk being hollowed on its under side to form a chamber above the inverted cup-shaped portion and having its outer side beveled upwardly and outwardly to coact with the beveled upper edge of the chamber of the body or casing, for the purpose set forth.

In testimony whereof I have hereunto set my hand in presence of two subscribing witnesses.

JOSEPH HERBERT RUFF.

Witnesses:
W. H. DUTTON,
F. E. DODGE.